US006865577B1

(12) United States Patent
Sereda

(10) Patent No.: US 6,865,577 B1
(45) Date of Patent: Mar. 8, 2005

(54) METHOD AND SYSTEM FOR EFFICIENTLY RETRIEVING INFORMATION FROM A DATABASE

(75) Inventor: Gregory Sereda, Wall Township, Monmouth County, NJ (US)

(73) Assignee: AT&T Corp., New York, NY (US)

( * ) Notice: Subject to any disclaimer, the term of this patent is extended or adjusted under 35 U.S.C. 154(b) by 372 days.

(21) Appl. No.: 09/707,462

(22) Filed: Nov. 6, 2000

(51) Int. Cl.[7] .............................................. G06F 17/30
(52) U.S. Cl. .......................................... 707/100; 707/1
(58) Field of Search .............................. 707/1, 2, 100, 707/3

(56) References Cited

U.S. PATENT DOCUMENTS

| | | | |
|---|---|---|---|
| 4,945,475 A | * | 7/1990 | Bruffey et al. .................. 707/1 |
| 5,440,732 A | * | 8/1995 | Lomet et al. ................... 707/1 |
| 5,511,190 A | | 4/1996 | Sharma et al. |
| 5,694,569 A | | 12/1997 | Fischer |
| 5,802,521 A | | 9/1998 | Ziauddin et al. |
| 5,809,494 A | | 9/1998 | Nguyen |
| 5,819,291 A | | 10/1998 | Haimowitz et al. |
| 5,956,509 A | * | 9/1999 | Kevner ....................... 709/330 |
| 6,076,084 A | * | 6/2000 | Harlan ........................... 707/1 |
| 6,535,869 B1 | * | 3/2003 | Housel, III .................... 707/2 |
| 6,553,372 B1 | * | 4/2003 | Brassell et al. ................ 707/5 |

OTHER PUBLICATIONS

Raj Jain, A Comparison of Hashing Schemes for Address Lookup in Computer Networks, IEEE Transactions on Communications, Oct. 1992, vol. 40 issue 10, p. 1570–1573.*

Algorithms, by Robert Sedgewick, 2d ed., 1988, pp. 231–243.

Database Design, by Gio Wiederhold, 1977, pp. 1–3, 213–216.

C Programmer's Guide to Serial Communications, by Joe Campbell, 1st ed., 1987, pp. 53–74, 538–550.

* cited by examiner

Primary Examiner—Greta Robinson

(57) ABSTRACT

A method for fast and efficient record retrieval in large databases using cyclical redundancy check (CRC) computations as hash functions. Two hash values are computed for each record's key using the CRC-CCITT and CRC-16 generator polynomials. The two CRC values then are combined into a four-byte composite hash value that represents a binary signature of the record's key. Alternately, a single CRC-32 value can be used as a four-byte hash value. In most cases, this four-byte hash value uniquely identifies the record's key. An index file is constructed using a hybrid search method, part hash table and part linear search. The index file is searched to find a match for the four-byte hash value and the record's offset is obtained. The record's offset is used to retrieve the record from the database.

21 Claims, 5 Drawing Sheets

$103_0$:
| CRC-16 | RECORD OFFSET |
| CRC-16 | RECORD OFFSET |
| 0 | MAXVALUE |
| 0 | NEXT OFFSET |

$103_1$ (with 107, 109 labels):
- 105a: CRC-16 | RECORD OFFSET
- 105b: CRC-16 | RECORD OFFSET
- 105c: CRC-16 | RECORD OFFSET
- 105d: 0 | NEXT OFFSET (REPEATS)

$103_{65535}$:
| CRC-16 | RECORD OFFSET |
| 0 | RECORD OFFSET |
| 0 | RECORD OFFSET |
| 0 | NEXT OFFSET |

$OVERFLOW_1$ → $103_{1A}$:
| CRC-16 | RECORD OFFSET |
| CRC-16 | RECORD OFFSET |
| 0 | MAXVALUE |
| 0 | NEXT OFFSET |

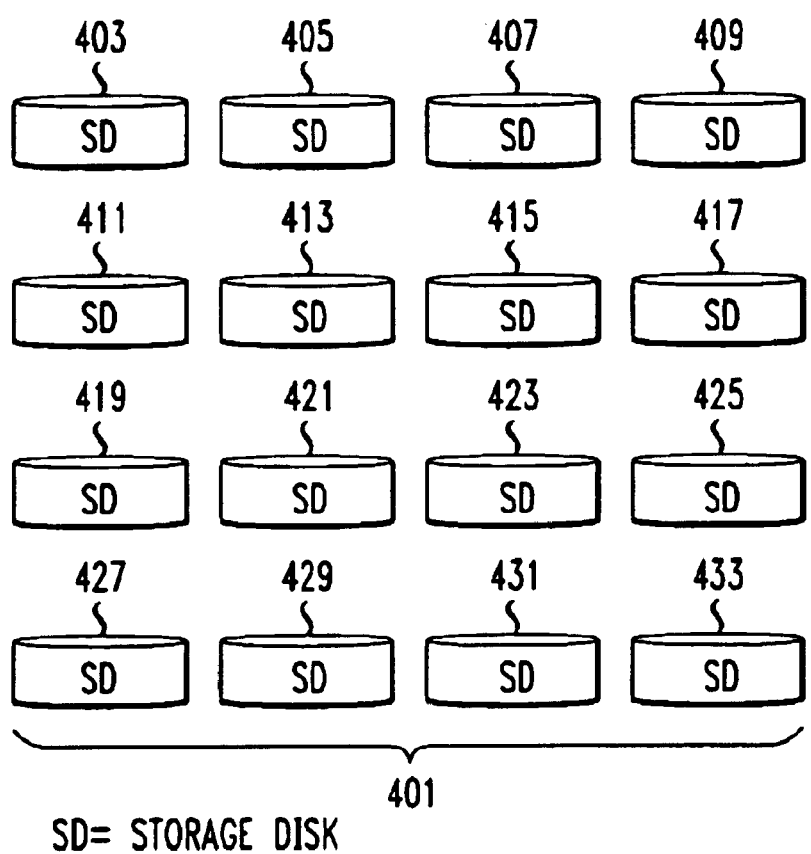

METHOD AND SYSTEM FOR EFFICIENTLY RETRIEVING INFORMATION FROM A DATABASE

BACKGROUND OF THE INVENTION

1. Field of the Invention

The invention relates to a system and method for locating and retrieving information from very large databases. Such a system and method are particularly useful, for example, with electronic mail systems, which require fast retrieval of user directory information for routing large volumes of messages.

2. Discussion of the Prior Art

Management of information has become critical to modern civilization. Information that is collected together in an organized fashion is referred to as a database. A database file conventionally consists of a group of records, with each record then being subdivided into one or more fields. For example, a database for routing e-mail might contain the database records:

smith@company.com|Jane|Smith|password|/usr/js/mailbox jjones@company.com|John|Jones|secret|/usr/jj/mailbox In this example, each database record consists of five fields: an e-mail address field, a first name field, a last name field, a mail password field, and mailbox location field. The record terminator is a new line character and the field terminator is the |character. Each record may have a different location in memory. The record offset (i.e., the position of the record in the database memory relative to a reference point) for the record containing the term "jsmith@company.com" may be 0, for example, while the record offset for the record containing the term "jjones@company.com" may be 54.

The information within one or more of the fields for a record may be used to locate and retrieve the record from the database. The field information used to retrieve a record is commonly called the key, and the field in which this key information is stored is called the key field. In the e-mail routing database described above, for example, the key might be the user's e-mail address. Thus, when someone wanted to retrieve a user's mailbox location, he or she could employ the user's e-mail address to locate and retrieve the database record containing the same e-mail address (i.e., a matching key) in its key field. Preferably, a database is optimized so that record retrieval based on each record's key is fast and efficient One method of locating and retrieving a record from a database is to sequentially access and search each record's key field until a matching key is located. This method of record retrieval is referred to as a linear search. However, as the number of records in a database increases, it is neither fast nor efficient to sequentially examine each record to find the one with a matching key. To improve record retrieval speed in a larger database, an index table is often built for the database.

The use of index tables to improve database record retrieval speed is well known in the art. One method of employing index tables is the indirect accessing method. With the indirect accessing method, only a pointer list is accessed directly. Each pointer in the list identifies the location of a record in memory, and the pointer's position in the list is defined by that record's key. Thus, a key can be used to quickly obtain the pointer, and thus the address, for the record with the matching key.

According to this method, the index table can directly index each record's pointer by that record's key. If the key information has a large number of possible values, however, then the index table will require a correspondingly large amount of memory. For this reason, index tables typically use a key-to-address transformation algorithm to index the pointers. That is, the pointer for each record is indexed by a mathematical transformation of the record's key, rather than by the key itself.

The key-to-address transformation is often performed using a hash (or hashing) function. A hash function is any process that maps data to a numerical value. For example, one hash function may convert the characters of a key into their ASCII value, add the ASCII values, and then divide the added ASCII values by a prime number to produce a remainder as the hash value. Because the hash function can be selected to limit the maximum possible hash value of a key, indexing the records against hash values reduces the amount of memory required for the index table.

The use of a hash function presents an additional problem, however. A hash function may generate the same hash value for two different keys from two different records. This is referred to as a collision. When this occurs, the hash value cannot be used to uniquely identify the location of the record in the database.

Several methods for resolving such collisions are described in the prior art. The separate chaining method creates a linked list of records whose keys have the same hash value. Once a hash value is obtained from a key during a search, each linked record for that hash value can be reviewed until a matching key is found. With the linear probing method, the hash value identifies a specific location in the index table. If this location does not contain a matching key (or an address for a record with a matching key), each subsequent memory location is probed until a matching key (or an address for a record with a matching key) is found.

The double hashing method extends the linear probing method to avoid the problem of clustering that can make linear probing slow for tables that are nearly full. The double hashing method uses two different hash functions. The first hash function identifies a specific location in the index memory, and the second hash function identifies a further address offset from that initial location.

As the number of records in a database increases, however, these methods for collision-resolution become less efficient. The number of collisions increases with the size of the database, causing the amount of memory required to implement the collision resolution methods to increase as well. Also, collision-resolution requires access to the record's key for comparison with the search key. In the case of indirect access, retrieval of the actual record for key comparison degrades the performance. While the key may be stored in the index table for ready comparison when collisions occur, this alternative significantly increases the size of the index table.

Further, the hashing function itself becomes more difficult to implement as the number of records in a database increases. For the open addressing methods, such as linear probing, the index table size must be greater than the number of records in the database. For the commonly used "remainder of division" hash function, the size of the hash table should be prime, and computing the hash value for long keys can be expensive in terms of processing time.

SUMMARY OF INVENTION

The invention provides a method and system for creating and using database index tables that may offer many advantages. For example, index tables according to the invention may be used to index even very large databases with only a small number of collisions between hash values. Further, the index tables of the invention use hash values that can be quickly and efficiently processed. Moreover, the space required to store the index table is very small.

According to one embodiment of the invention, two different cyclical redundancy check (CRC) values are obtained for each record key to be indexed. The first CRC value defines the portion of the index table in which the record's address is stored. The second CRC value is then stored with the record's address in the table. To then retrieve a record based upon a search key, the key's first CRC value narrows the portion of the index table to be searched. Once a specific portion of the index table is identified with the first CRC value (which can be thought of as a table within a table), that portion of the table can be sequentially searched until the second CRC value for the search key is located. The second CRC value then identifies the memory address of the record containing a matching record key. Because CRC values are collision resistant, the chance of collision within an index table using at least two types of CRC values is very low. Further, because CRC values can be quickly calculated using tables, the processing time for calculating an index value is reduced. Also, in addition to using CRC values obtained from a record's key to index that record's address, various embodiments of the invention also employ CRC values from a record's key to position that record among a plurality of different storage media

DESCRIPTION OF THE DRAWINGS

FIG. 1 illustrates a database index table according to one embodiment of the invention.

FIG. 4 illustrates a plurality of different storage media for storing a database according to the invention.

DETAILED DESCRIPTION OF PREFERRED EMBODIMENTS OF THE INVENTION

Figure 2A:
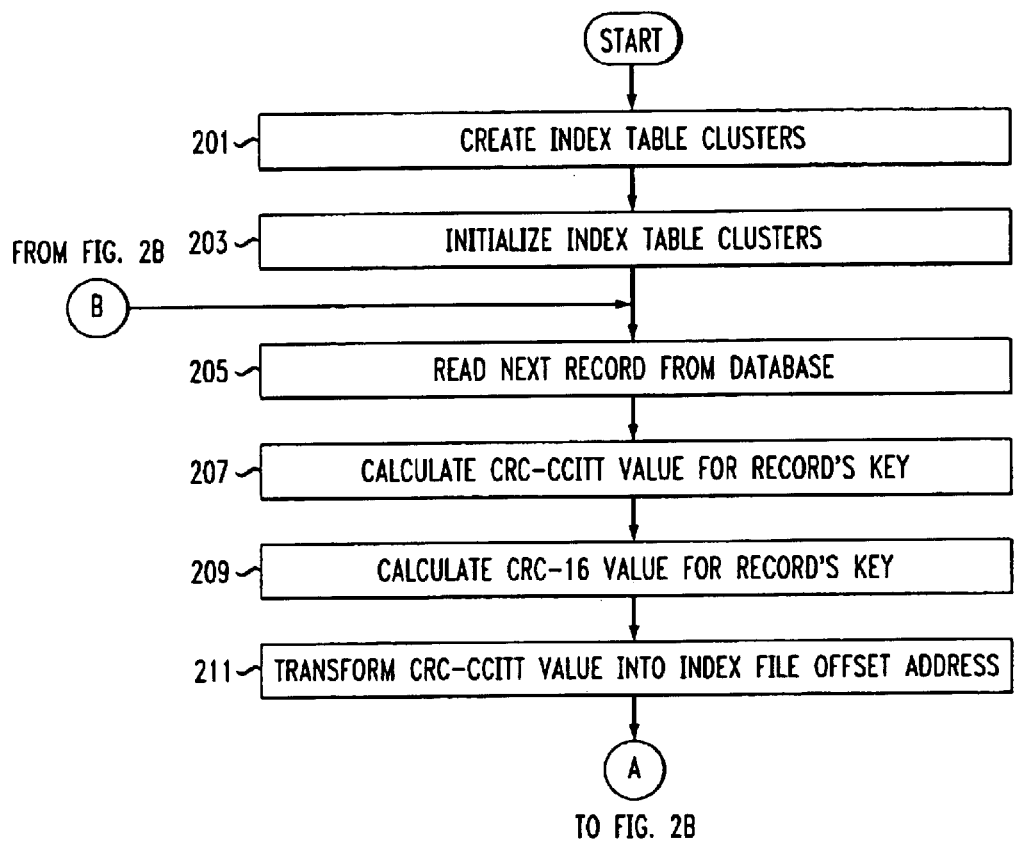
FIGS. 2A and 2B illustrate one method of generating the database index table of FIG. 1.

Outside of the field of database management, in the field of data communications, various methods have been used to ensure that data has been accurately received or retrieved from storage. One of these methods employs polynomial division to compute a cyclical redundancy check (CRC) value. The CRC value is used to verify that no errors have occurred in a block of data as a result of transmission or storage. According to this method, the polynomial representation of the data is divided, modulo 2, by a preselected generator polynomial. The resulting CRC value is then transmitted with the data. The recipient of the data divides the polynomial representation of the received communication by the same generator polynomial, and confirms that the newly calculated CRC check value is the same as the transmitted CRC value. In this way, the recipient can ascertain if the transmitted data has been corrupted.

Cyclical redundancy check (CRC) computations are typically collision resistant (i.e., they do not usually produce the same check value for different blocks of data). As it turns out, this characteristic that makes CRC computations very good at detecting communication errors also allows them to be useful as a hashing function for generating a database index table, because they give an even distribution across the key space. According to the invention, then, a (CRC) computation is used as the hashing function to produce a database index table according to any conventional method. More preferably, two different types of CRC computations are performed on each key of a database to produce a database index table.

The prior art recognizes at least three CRC generator polynomials as being particularly good at detecting differences in blocks of data. The first is the CRC-CCITT, set forth by the Comite Consultatif International de Telegraphique et Telephonique, defined as:

$$X^{16}+X^{12}+X^{5}+1.$$

The second is the CRC-16, defined as:

$$X^{16}+X^{15}+X^{2}+1.$$

The third is the CRC-32, defined as:

$$X^{32}+X^{26}+X^{23}+X^{22}+X^{16}+X^{12}+X^{11}+X^{10}+X^{8}+X^{7}+X^{5}+X^{4}+X^{2}+X+1.$$

As noted above, each of these generator polynomials are particularly collision resistant. Moreover, table driven methods have been developed that allow the fast computation of CRC-CCITT, CRC-16, and CRC-32 values at a minimal cost in terms of processing time.

The CRC-CCITT and CRC-16 computations produce a two-byte CRC value. (The CRC-32 computation, on the other hand, produces a four-byte value, as will be discussed further below.) Thus, combining the two two-byte CRC values generated by the CRC-CCITT and CRC-16 computations on a record's key generates a composite four-byte hash value, which represents a binary signature of the record's key. Because both the CRC-CCITT and CRC-16 computations give a very good distribution for any range of possible keys, and they can produce up to $2^{32}$ possible values, the probability of two different keys have the same composite CRC-CCITT/CRC-16 hash value is very small. In practice, the composite four-byte CRC-CCITT/CRC-16 hash value will almost always uniquely identify a record's key. According to more preferred embodiments of the invention, composite four-byte CRC-CCITT/CRC-16 hash values may he used to create a database index table according to any conventional method.

The use of composite CRC-CCITT/CRC-16 four-byte hash values with conventional database index methods, however, may require large amounts of memory. For example, to employ a four-byte CRC-CCITT/CRC-16 hash value with the indirect accessing method requires a hash index table with $^{32}$ entries. If each address pointer (e.g., offsets to the record in the database) in the table were then a four-byte number, the size of the required index table would need to be 16 GB.

Accordingly, other preferred embodiments of the invention may use a hybrid method for indexing the address pointers. This hybrid method includes both indirect addressing and linear searching. According to this method, the composite CRC-CCITT/CRC-16four-byte hash value is divided up into its two two-byte values. The CRC-CCITT value is used for indirect addressing, as with a classic hash index table, while the CRC-16 value is then used as a "key" in a linear search.

More particularly, the address translation of the CRC-CCITT value of the key provides a "start" location in the index table. A linear search for an indexed CRC-16 value matching the CRC-16 value of the key then begins from this start location. This linear search is efficient because the data to be searched is sequential and minimal in size. The four-byte offset for each record in the database is stored with the CRC-16 value of its key. Thus, when an indexed CRC-16 value matching the CRC-16 value of the key is found, the associated four-byte offset is used to retrieve the record. The search key is then compared with the record's key, to confirm that they are the same.

A database index table 101 that implements this hybrid method is shown in FIG. 1. The database indexed by this particular embodiment of this invention uses variable width database records to reduce the amount of memory space required, but fixed width records may alternately be employed as will be discussed below. The index table is initially formed by a plurality of fixed-size index table clusters $103_0$, $103_1$, ... $103_N$, where illustratively in FIG. 1 N equals 66635. Using fixed-sized clusters permits easier record addition and deletion, but variable-sized clusters may alternately be used to reduce the amount of required memory space or to reduce overflow problems.

Stated in other words, particular embodiment shown in FIG. 1 with $2^{16}$ (i.e., 65,536) initial data clusters 1030 to 10365535 (i.e., data clusters created to initially form the index table). Thus, the index conveniently has one initial data cluster $103_1$ corresponding to each possible CRC-CCIT value. Other embodiments, however, may employ fewer or greater numbers of initial data clusters. Further, as will be explained in detail below, overflow data clusters may be added to the index table.

Each index table cluster $103_1$ contains an array of entries. FIG. 1 illustrates clusters with four entries in which records, or tuples, can be stored, as illustrated by tuples, 105a–105d of cluster $103_1$, but the number of entries may be varied to optimize the performance of the index table 101, as will be explained in detail below. Each entry in the index table has one two-byte CRC-16 field (e.g., field 107 of cluster $103_1$) and one four-byte record offset field (e.g., field 109 of cluster $103_1$). In this particular embodiment, unused entries have the CRC-16 field set to 0 and the offset field 109 set to its maximum value (MAXVALUE), but other values can alternately be employed.

While the entries of each index table cluster are available to store CRC values and record offsets, the last entry of each index table cluster is reserved for use as a link pointer. When all but the last entry in an index table cluster are filled, and a new record offset value needs to be added to the index table cluster, an overflow index table cluster is created. The address of this overflow index table cluster 103 is then stored in the last entry, and the new record offset value is stored in the first entry of the overflow index table cluster. For example, as shown in FIG. 1, when entries 105a–105c of initial index table cluster $103_1$ are filled, the overflow index table cluster $103_{1A}$ is created, and the starting address of this overflow index table cluster $103_{1A}$ is stored in entry 105d of initial index table cluster $103_1$ As will be understood by those of ordinary skill in the art, if all but the entry of the overflow index table cluster $103_{1A}$ are filled, a second overflow index table cluster $103_{1B}$ (not shown) is created, and the starting address of this overflow index table cluster $103_{1B}$ is stored in the last entry of index table cluster $103_{1A}$. As will also be appreciated by those of ordinary skill in the art, additional overflow table can be created and linked to full overflow tables as necessary. Thus, additional CRC-16 values and their corresponding record offsets that cannot be stored in a full initial index table cluster can be stored in an overflow index table cluster directly or indirectly linked to the full index table cluster.

Figure 2B:
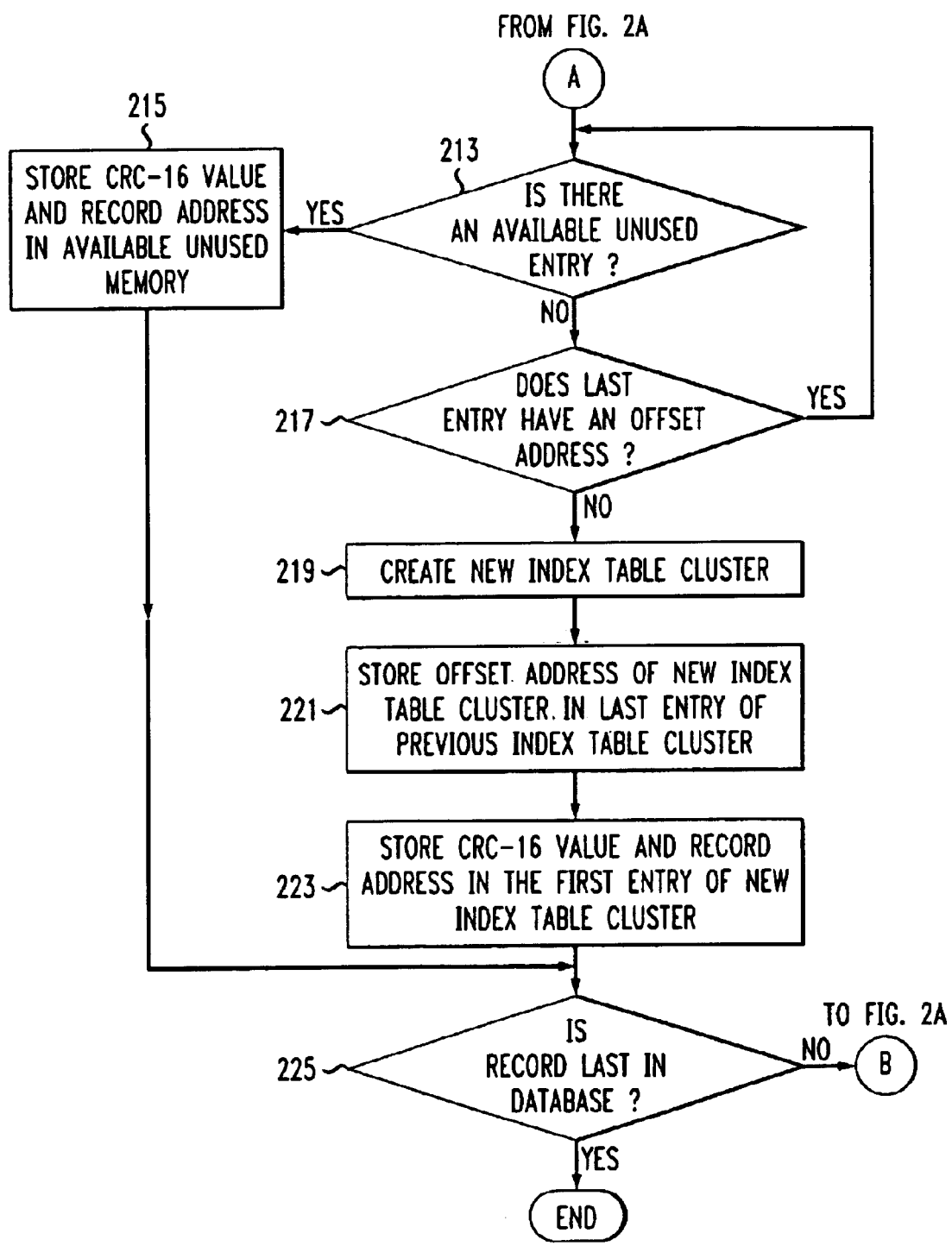

The method for creating the index table 101 will now be described with reference to FIGS. 2A and 2B. First, instep 201, a file is created with $2^{16}$ (i.e., 65,536) empty initial index table clusters 103. In other words, initial index table clusters $103_0$ to $103_{65535}$ are preallocated, one for each possible two-byte CRC-CCITT value. Then, in step 203, the empty entries of the index table clusters are initialized to contain the value 0 in the CRC-16field and the maximum value in the offset field. Of course, those of ordinary skill in the art will appreciate that the steps 201 and 203 may be combined into a single index table cluster creation step.

Once the index table clusters have been generated and initialized, the first database record (or, if the process of creating the table has already been proceeding, the next database record) and its offset value within the database are read from the database in step 205. The two-byte CRC-CCITT value for the record's key is then calculated in step 207, while the two-byte. CRC-16 value for the record's key is calculated in step 209. Again, those of ordinary skill in the art will appreciate that the order of these steps may be reversed, or that these steps may be combined into a single step.

In step 211, the CRC-CCITT value is transformed into an index file offset by the equation:

$$\text{Index}(N) = N * K * B$$

where N is the CRC-CCITT value of the record's key, K is the number of entries in an index table cluster, and B is the number of bytes per entry. Thus, Index(N) gives the address offset of the initial index table cluster 103 corresponding to the computed CRC-CCITT value N of the record's key. It should be noted that this formula for determining Index(N) is based upon that assumption that the smallest addressable memory unit is one byte, as is conventional. Other embodiments of the invention may alternately employ memories with any discretely addressable memory unit size, however. Thus, the formula above may be more generically written as $$\text{Index}(N) = N * K * L$$

where L is the number of addressable memory locations within an entry of the index table cluster.

Next, in step 213, each entry in this first index table cluster 103 is sequentially checked to see if the index table cluster 103 contains an available unused entry. If it does, then in step 215 the CRC-16 value and record address for the record are stored in the first available unused entry of this initial index table cluster 103, and the process continues to step 225. (As previously noted, while the last entry of an index table cluster may be unused, it is not available to store a CRC-16 value and record address.)

If the first index table cluster 103 does not contain an available unused entry, then the last entry 105d is checked in step 217 to see if its offset field 109 contains an offset address for a linked overflow index table cluster. If it does, then the processes of steps 213 through 217 are performed for this second (and any subsequent) index table cluster 103. If, on the other hand, the last entry 105d of the first (or any subsequent) index table cluster 103 is empty, then a new index table cluster 103 is created in step 219, and the offset address of this new index table cluster is stored in the offset field 109 of the last entry 105d of the previously searched index table cluster 103 in step 221. Then, in step 223, the CRC-16 value and record address for the most-recently read record are stored in the first entry of this newly created index table cluster. Lastly, in step 225, it is determined whether the most-recently read record was the last record in the database. If it was, then the process of creating the index table 101 ends. If it was not the last record in the database, then the process returns to step 205 to continue the process with the next unread record in the database. Thus, the process of creating the index table 101 continues until all records of the database have been indexed.

Figure 3:
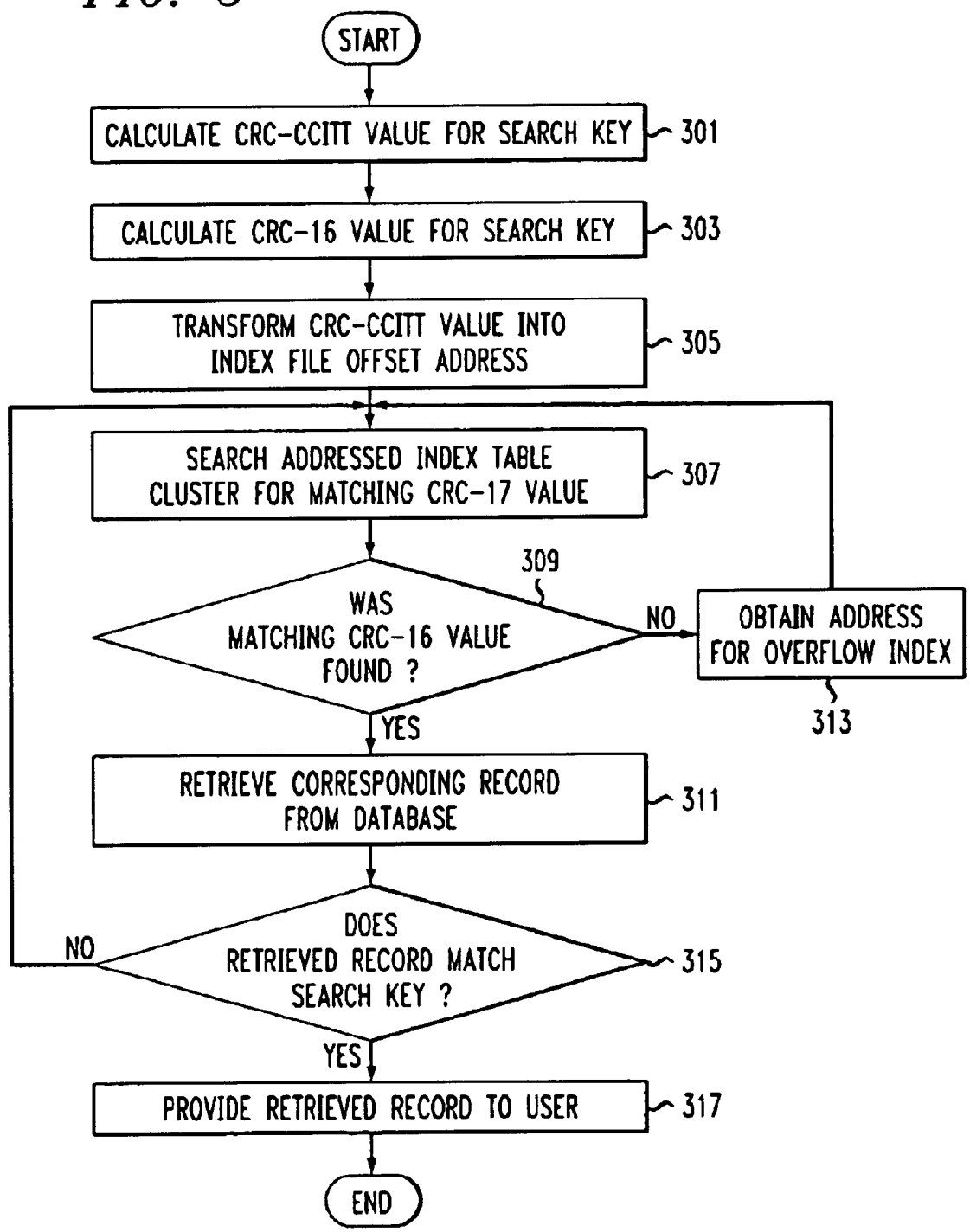
FIGS. 3A and 3B illustrates a method of searching the database index table shown in FIG. 1.

A method for using the index table 101 will now be described with reference to FIG. 3. When a user provides a search key, the two-byte CRC-CCITT value for the search key first is calculated in step 301, while the two-byte CRC-16 value for the search key is calculated in step 303. In step 305, the CRC-CCITT value is transformed into an index file offset by the equation:

$$\text{Index}(N)=N*K*B$$

where N is the CRC-CCITT value of the record's key, K is the number of entries in an index table cluster, and B is the number of bytes per entry. Then, in step 307, the CRC-16 field of each entry in the addressed index table cluster 103 is sequentially searched until an entry is found with a matching CRC-16 value. If it is determined in step 309 that an entry with a matching CRC-16 value has been found, then the corresponding record address in that entry is used to retrieve a record from the database in step 311. If an entry with a matching CRC-16 value is not found, then the offset address for an overflow index cluster table (stored in the offset record field 109 of the last entry 105d) is used to repeat the search in the overflow index table cluster. Steps 307, 309 and 313 are repeated until an entry with a matching CRC-16 value is found and the corresponding record retrieved in step 311, or until there are no further index table entries 105 to be searched. If there are no further index table entries 105 to be searched and a matching CRC-16 has not been found, then the process returns an error message (not shown) indicated that the desired record is not in the database.

On the other hand, once the record has been retrieved in step 311, its key is compared with the search key in step 315 to confirm that they are the same. If the search key and the retrieved record key are the same, then the retrieved record is provided to the user in step 317. If the search key and the retrieved record key are not the same, the process returns to repeat steps 307–315 until a record with a matching key is retrieved and provided to the user in step 317 or, alternately, until an error message is returned to the user.

Thus, an index file according to some preferred embodiments of the invention is a hash table based on CRC-CCITT values. It consists of linked lists of fixed size index table clusters containing entries for each record's key's CRC-16 value and record offset. Since all entries within a linked list of index table clusters have the same computed CRC-CCITT value, only the CRC-16 values need to be compared once the appropriate initial index table cluster has been identified. If one matches the CRC-16 value computed for the search key, the corresponding record is retrieved from the database file using the record's offset stored with the CRC-16 value. The search key is then compared to the key of the retrieved record. If the keys do not match, a double collision has occurred and the search continues at the next index table entry.

As mentioned above, the size K of the index table clusters 103 can be adjusted to improve the performance of the search or to reduce disk space. If K is too large for the number of records in the database, the index file 101 consumes more disk space than is necessary because most index table clusters 103 are only partially used. If, on the other hand, K is too small, then many overflow index table clusters 103 will need to be created and linked. Because every link that is traversed requires a disk access to the index file 101, performance degrades as the number of linked clusters 103 increases. To change K, the index file 101 must be regenerated, as all index table clusters are preferably the same size.

To document the performance of the above-described embodiment of the invention, the following test results were obtained from a Sun Microsystems Enterprise E4500/E5500 computer with 2.0 GB of main memory and 4 CPUs, each operating at 400 MHz. The operating system was SunOS version 5.6, and the tests were performed during idle periods to minimize the impact of other users on the test results. A test database file was constructed on a local disk. The database contained 20,000,000 records of 100 bytes each. The resulting database file size was 2 GB. The record's key field was a 7 character hexadecimal string representation of the record number. The database records were sequentially ordered from "0000000" to "1312cff".

According to the embodiment of this invention described in detail above, an index file was created with the index table cluster size K set to 100. The resulting index file size was 141 MB, or approximately 7% of the database file. Creating the index file required about 45 minutes on this system, and the average processing time to add records to the index file was 7,407 records/sec.

To compare methods, three test programs were evaluated. The first program, gethash, simulated the classic hash table approach. By ignoring the second CRC-16 hash value in the index file, it resolved collisions by retrieving records with the same CRC-CCITT value until it found the correct record. The second program, getrec, used the method according to this invention described in detail above. By comparing the second CRC-16 hash value, it virtually eliminated collisions.

The last program, getdirect, represented the theoretical minimal solution. It did not use an index file. Instead, it transformed the search key into the record number and retrieved the record directly from the database file. This approach worked because the test database's key field encoded the record number as a 7-character hexadecimal string, and fixed length records were used. Thus, the offset used to retrieve a record was the integer equivalent of the search key, multiplied by 100.

To simulate real conditions, the test programs generated random queries using the random ( ) function. To ensure that each test run used a new series of random numbers, the random number generator was seeded with a new random number each time. The test programs performed random queries over the entire range of possible records, and were run several times to reach steady state conditions. The detailed usage times for the test programs were obtained by employing the timex command and are shown in Table 1. Each of the above-discussed programs is listed in the attached Appendices A–H, which is incorporated entirely herein by reference.

TABLE 1

Performance data for test programs.

|  | gethash | getrec | getdirect |
| --- | --- | --- | --- |
| Number of Queries | 10,000 | 100,000 | 100,000 |
| Real (seconds) | 700.12 | 102.75 | 95.68 |
| User (seconds) | 9.79 | 2.78 | 1.90 |
| Sys (seconds) | 55.92 | 8.60 | 4.18 |
| Collisions | 1,621,635 | 268 | .0 |
| Random Queries/sec | 14 | 973 | 1,045 |
| Cached Queries/sec | 186 | 9,930 | 20,408 |

The last row of Table 1, Cached Queries/sec, were the test results produced when the random number generator was not seeded and the same series of "random" queries were repeated. The disk cache eliminated wait I/O time and the performance increased by a factor of 10 to 20. However, this does not reflect real conditions where the queries are expected to be of random nature.

The test results show that the number of collisions largely determines performance. The getdirect program had no collisions. The getrec program had an average of 268 collisions per 100,000 queries. The gethash program had an average of 162 collisions per single query. By virtually eliminating collisions, the getrec program approached the performance of the getdirect program while employing modest resources for the index file. Thus, this invention provides a method for fast and efficient record retrieval in large databases that has nearly the performance of the theoretical minimal solution.

There are many possible embodiments of this invention that relate to how the index file and database files are organized. For the most part, these involve tradeoffs between ease of adding or modifying records in the database versus the amount of disk space required for the index file and database file. As will be appreciated by those of ordinary skill in the art, what is best for one database application may differ for another database application. For example, the database file may be organized with fixed width records or variable width records having defined special record and field terminators. Fixed width records make updating a record simple because it can be done in place. If a variable width record needs to be updated and its record length has grown, the record must be moved, usually to the end of the database file by appending the new record and updating the record's index pointer to this new location. However, variable width records can save substantial disk space because records are not filled with unused data.

Still other embodiments of this invention may use other CRC algorithms or other combinations of CRC algorithms. For example, one embodiment of the invention may use a single four-byte CRC-32 calculation instead of the combination CRC-CCITT/CRC-16 calculations in the above-described embodiment. For example, the lower order two bytes of a CRC-32 value for a record's key can be used as the index table offset value (i.e., to determine the appropriate index table cluster in place of the CRC-CCITT value described above). The higher order two bytes of the record's key's CRC-32 value may then be used to locate a database offset record within the appropriate index table cluster (i.e., in place of the CRC-16 value described above). This alternate embodiment may reduce the number of collisions by 50% over the previously described embodiment.

With still another embodiment of the invention, a four-byte CRC-32 value may be used in place of the two-byte CRC-16 values in the first-described embodiment discussed above. While this alternate embodiment will require additional memory to accommodate the additional two bytes required per index table cluster entry 105, the use of four byte CRC-32 values instead of the two-byte CRC-16 values will further reduce the frequency of collisions. Of course, those of ordinary skill in the art will appreciate that still other CRC algorithms or combinations of CRC algorithms can be employed.

Further, various embodiments of the invention may have other fields added to the index table to reduce collisions or aid in the retrieval of the database record. For example, each entry in the index cluster may include a field for a record's length. This may be useful where a database employs a variable width record system.

A database according to the various embodiments of the invention described above can be implemented with any type of memory storage, such as memory provided by an integrated circuit (commonly referred to as "main memory"), a disk containing a magnetic, optical, or magneto-optical storage medium, a holographic storage memory, etc. While main memory provides very fast data retrieval, this storage method requires a very large amount of a relatively expensive storage medium to implement large databases. Further, the memory must typically be initialized each time that the computer storing the memory is restarted. Therefore, large databases according to the invention may be more commonly implemented using a disk cache. (As is known in the art, a disk cache is a portion of main memory set aside to temporarily store information read from another storage medium, e.g., a storage disk, such as a magnetic, optical or opto-magneto storage disk.) If information is retrieved from the database at random, however, as the size of a database increases, the usefulness of a disk cache decreases significantly. The time typically required to access data on a disk is about 8 ms. Thus, on average, a single disk will only be able to make 120 random accesses per second.

To increase throughput, a database according to the invention may be stored on different storage disks. That is, the information in the database can be distributed across different storage disks. Therefore, according to still another embodiment of the invention, a CRC value or a portion of a CRC value can be used to physically distribute the records in the database amongst a plurality of storage disks.

With the previously discussed embodiments of the invention, a key for each record is converted into one or more CRC values (e.g., a CRC-16 value, a CRC-32 value, a CRC-CCITT value, or a combination of any of these CRC values) when the record is initially stored in the database. This CRC value (or values) also can be used to determine on which storage disk, out of a plurality of storage disks, the record will physically be stored. Thus, if the database 401 is to be divided between sixteen storage disks 403–433 as shown in FIG. 4, four bits of a CRC value (or values) for a record's key can be used to determine on which of the sixteen storage disks the record will physically be stored. For example, if the first four bits of a CRC value for a records key are 0010 (i.e., 2), then the record may be stored on storage disk 407 (the third storage disk in the group). Similarly, if the first four bits of a CRC value for a records key are 1110 (i.e., 14), then the record may be stored on storage disk 431 (the fifteenth storage disk in the group). Because the CRC algorithms typically give a very even distribution of CRC values over a key range, using CRC values to determine the physical distribution of records onto multiple storage disks will give an even distribution of the records.

The present invention has been described above by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, the specification is not intended to limit the invention to the exact construction and operation as illustrated and described. For example, the invention may include any one or more elements from the apparatus and methods described herein in any combination or subcombination. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A method of cataloging information in a database, comprising:
   determining a key for referencing a record of information stored in a database;
   determining a record address for the record in the database;
   determining a first cyclical redundancy check value for the key; and
   storing a tuple in an index at a position corresponding to at least a portion of the first cyclical redundancy check value, said tuple containing the record address and at least a portion of a second cyclical redundancy check value determined for the key.

2. The method of cataloging information recited in claim 1, wherein the first cyclical redundancy check value is a CRC-CCITT, CRC-16, or CRC-32 cyclical redundancy check value.

3. The method of cataloging information recited in claim 2, wherein the cyclical redundancy check value is a CRC-16 cyclical redundancy check value.

4. The method of cataloging information recited in claim 1, wherein the at least a portion of the first cyclical redundancy check value encompasses values defined by a first preselected set of bits of said first cyclical redundancy check value.

5. The method of cataloging information recited in claim 1, wherein the at least a portion of the second cyclical redundancy check value encompasses values defined by a second preselected set of bits of said second cyclical redundancy check value.

6. The method of cataloging information recited in claim 5, wherein the at least a portion of the second cyclical redundancy check value is the same as the at least a portion of the first cyclical redundancy check value.

7. The method of cataloging information recited in claim 5, wherein the first cyclical redundancy check value is also the second cyclical redundancy check value, and said first set of preselected bits is different from said second set of preselected bits.

8. The method of cataloging information recited in claim 5, wherein the first cyclical redundancy check value is also the second cyclical redundancy check value, and said first set of preselected bits is disjoint from said second set of preselected bits.

9. The method of cataloging information recited in claim 5, wherein the first cyclical redundancy check value is also the second cyclical redundancy check value, and bits in said second set of preselected bits are at least some of the bits not included in said first set of preselected bits.

10. The method of cataloging information recited in claim 1 further comprising the step of storing the record in one of a plurality of physically separate storage devices based on at least a portion of the second cyclical redundancy check value.

11. The method of cataloging information recited in claim 1, further including
   determining a third cyclical redundancy check value for the key; and
   storing the record on one of a plurality of storage devices based upon at least a portion of the third cyclical redundancy check value.

12. The method of cataloging information recited in claim 11, wherein the third cyclical redundancy check value is the same as the first cyclical redundancy check value.

13. The method of cataloging information recited in claim 11, wherein the at least a portion of the third cyclical redundancy check value is the same as the second cyclical redundancy check value or a portion thereof.

14. The method of cataloging information recited in claim 1, wherein the index is divided into index table clusters, each index table cluster having K number of entries with each entry having L number of locations; and
   further including
      sequentially checking a status of each entry in an index table cluster corresponding to the at least a portion of the cyclical redundancy check value until a first unused entry available to store the record address is recognized, and
      storing the record address in the recognized first available unused entry.

15. The method of cataloging information recited in claim 14, further including
   if an unused entry available to store the record address is not recognized from sequentially checking a status of each entry in the index table cluster corresponding to the at least a portion of the cyclical redundancy check value, then
   creating a second index table cluster corresponding to the at least a portion of the cyclical redundancy check value in the index;
   storing an address of the second index table cluster in the first index table cluster; and
   storing the record address in a first available unused entry of the second index table cluster.

16. The method of cataloging information recited in claim 14, wherein an initial location of the index table cluster corresponding to the at least a portion of the cyclical redundancy check value is positioned at an offset Index(N)= N*K*L, where N is the at least a portion of the cyclical redundancy check value.

17. A method of obtaining a record of information from a database, comprising:
   determining a key for referencing the record in the database;
   determining a cyclical redundancy check value for the key;
   determining a position in an index corresponding to at least a portion of the calculated cyclical redundancy check value;
   determining a second cyclical redundancy check value for the key; and
   retrieving from a memory pointed to by contents of said index at said position one or more tuples, where each tuple contains an address field A and a value field, and selecting the address field of a retrieved tuple whose value field is equal to at least a portion of said second cyclical redundancy check value.

18. The method of obtaining a record of information from a database recited in claim 17, wherein the first cyclical redundancy check value is a CRC-CCITT. CRC-16. or CRC-32 cyclical redundancy check value.

19. The method of obtaining a record of information from a database recited in claim 17, wherein the memory pointed to by contents of said index at said position is an index cluster, and said retrieving tuples proceeds until a tuple is found where the value field of the retrieved tuple equals said at least a portion of said second cyclical redundancy check value.

20. The method of obtaining a record of information from a database recited in claim 17, wherein
   the memory pointed to by contents of said index at said position is an index cluster, and
   said retrieving tuples
      proceeds until all tuples in said index cluster have been retrieved;

when a single tuple is found where the value field of the retrieved tuple equals said at least a portion of said second cyclical redundancy check value retrieving said record based on the address field of said single tuple when a number of tuples are found where the value field of the retrieved tuple equals said at least a portion of said second cyclical redundancy check value, retrieving a record associated with each retrieved tuple where the value field is equal to said at least a portion of said second cyclical redundancy check value and comparing key of each retrieved record to said key.

21. The method of obtaining a record of information from a database recited in claim 17, wherein the index is divided into index table clusters, each index table cluster having K number of index entries with each index entry having L number of locations; and an initial location of an index table cluster corresponding to the at least a portion of the cyclical redundancy check value is positioned at an offset Index(N)= N*K*L, where N is the at least a portion of the cyclical redundancy check value.

* * * * *